United States Patent
May

(10) Patent No.: US 12,512,024 B2
(45) Date of Patent: Dec. 30, 2025

(54) UTILIZING ENVIRONMENTAL VISIBILITY CONDITION FOR CONTROLLING DISPLAY SYSTEM ON HMD DEVICES

(71) Applicant: Microsoft Technology Licensing, LLC, Redmond, WA (US)

(72) Inventor: Keenan Russell May, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/653,886

(22) Filed: May 2, 2024

(65) Prior Publication Data
US 2025/0342783 A1 Nov. 6, 2025

(51) Int. Cl.
*G09G 3/00* (2006.01)
*G06T 7/00* (2017.01)

(52) U.S. Cl.
CPC ........... *G09G 3/001* (2013.01); *G06T 7/0002* (2013.01); *G06T 2207/30168* (2013.01); *G09G 2320/08* (2013.01)

(58) Field of Classification Search
CPC .. G09G 3/001; G09G 2320/08; G06T 7/0002; G06T 2207/30168; G06T 7/00; G02B 27/01; G06F 3/01; G06V 10/00; G06V 20/00; H04N 13/00; G06K 9/62
See application file for complete search history.

(56) References Cited

U.S. PATENT DOCUMENTS

| | | | |
|---|---|---|---|
| 9,087,471 B2 * | 7/2015 | Miao | G09G 3/003 |
| 11,137,610 B1 * | 10/2021 | Kessler | G02B 27/0176 |
| 11,209,681 B2 * | 12/2021 | Davis | G02C 7/086 |
| 11,435,593 B1 * | 9/2022 | Sztuk | G06T 7/70 |
| 2008/0218434 A1 * | 9/2008 | Kelly | G02B 27/01 345/7 |
| 2012/0050141 A1 * | 3/2012 | Border | G02B 27/01 345/8 |
| 2013/0127980 A1 * | 5/2013 | Haddick | G06F 3/013 348/14.08 |
| 2016/0025978 A1 * | 1/2016 | Mallinson | G02B 27/0172 345/8 |
| 2017/0177150 A1 * | 6/2017 | Chang | G09G 5/30 |
| 2019/0339528 A1 * | 11/2019 | Freeman | G09G 3/002 |
| 2020/0074724 A1 * | 3/2020 | Mathur | G06T 15/80 |
| 2021/0141229 A1 * | 5/2021 | Mathur | G02F 1/1313 |
| 2021/0168270 A1 * | 6/2021 | Browne | G06F 3/011 |
| 2023/0152587 A1 * | 5/2023 | Sztuk | G02B 27/0172 345/8 |
| 2025/0104580 A1 * | 3/2025 | Melax | G06T 11/00 |
| 2025/0111624 A1 * | 4/2025 | Huss | G06T 19/006 |

* cited by examiner

*Primary Examiner* — Bryan Earles
(74) *Attorney, Agent, or Firm* — Alleman Hall & Tuttle LLP

(57) ABSTRACT

One example provides a method enacted on a head mounted display (HMD) device including a display system. The method comprises operating the display system in one of a pass-through mode or a see-through mode. The method further comprises detecting a change in an environmental visibility condition using image data from an image sensor of the HMD device, and in response to the change, switching the display system to operate in another of the pass-through mode or the see-through mode.

20 Claims, 7 Drawing Sheets

UTILIZING ENVIRONMENTAL VISIBILITY CONDITION FOR CONTROLLING DISPLAY SYSTEM ON HMD DEVICES

BACKGROUND

Some head mounted display (HMD) devices utilize optical systems that combine projected digital content with a view of the surrounding environment through see-through projection optics to present mixed reality (MR) experiences. Some such HMDs also can operate in a pass-through mode, in which video image data of the surrounding environment, as acquired by one or more image sensors, is displayed to the user as a virtual reality (VR) experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a method enacted on a head mounted display (HMD) device including a display system. The method comprises operating the display system in one of a pass-through mode or a see-through mode. The method further comprises detecting a change in an environmental visibility condition using image data from an image sensor of the HMD device, and in response to the change, switching the display system to operate in another of the pass-through mode or the see-through mode.

DETAILED DESCRIPTION

Figure 1:
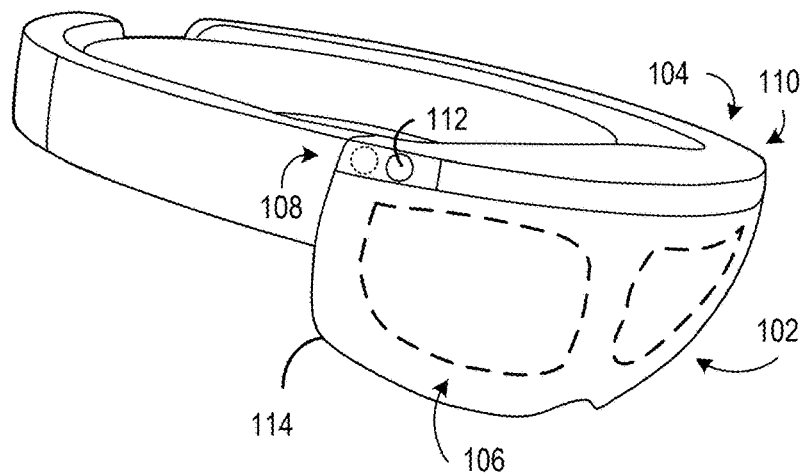
FIG. 1 schematically illustrates an example HMD device.

As mentioned above, an HMD device can include a see-through display system for combining projected digital content with a real-world background to present mixed reality (MR) experiences. Such an operating mode can be referred to as a see-through mode. This allows projected holographic content to be visually mixed with a view of the surrounding environment through see-through projection optics. However, an environmental visibility condition may change that affects the user's ability to perceive the surrounding environment through the HMD device. For example, a user may transition from a bright outside environment into a dark room. In some instances, an environmental visibility condition that impacts a user's natural vision may not be uniform across a field of view (FOV) of the display system. As one such example, the user may be in an environment where smoke is present that occludes a part of the environment from the user, while not occluding another part.

One possible solution is to adjust an operation mode of the display system to a pass-through mode. In the pass-through mode, video images of the surrounding environment acquired by cameras on the HMD device are displayed using the see-through display system. Further, a dimmer positioned between the see-through display system and the external environment from a perspective of a user of the HMD can be dimmed when in the pass-through mode, thereby providing an opaque background over which the video images are displayed.

However, switching between the see-through mode and the pass-through mode can be a manual process on HMD devices, and therefore can be distracting to the user. Further, current HMD display systems may operate in a same mode throughout a FOV of the display system, even where only a portion of the FOV may have an environmental visibility condition that restricts visibility of the environment.

Accordingly, examples are disclosed that relate to detecting a change in environmental lighting conditions, and automatically switching operating modes of a display system based at least upon the detected change. Briefly, a display system on an HMD device can operate in a see-through mode in which the surrounding environment is visible to a user through the HMD device. The HMD device is configured to detect changes in environmental visibility conditions that may affect viewing the surrounding environment with natural vision. In visibility conditions where natural vision is difficult, the HMD device is configured to switch the display from the see-through mode to a pass-through mode in response to detecting the change in the environmental visibility condition. In the pass-through mode, the display system is controlled to display images based at least upon image data from an image sensor on the HMD device. Such pass-through VR images can include information that is different than what can be perceived with natural vision, such as thermal images, night vision images, and/or depth images (e.g. presented as a mesh or other form), as examples.

Likewise, changes in the environmental visibility condition that improve visibility for natural vision can result in the HMD device automatically switching from the pass-through mode to the see-through mode. Therefore, a display system according to the disclosed examples can help a user maintain perception of the surrounding environment when transitioning through various visibility conditions.

In some examples, an HMD device according to the present disclosure can be configured to control the display system to detect changes in the environmental visibility condition independently for a plurality of segments of a FOV of the display system. Such a configuration enables the display system to display pass-through VR images for a portion of the FOV of the display system while utilizing the see-through mode for another portion of the FOV.

FIG. 1 schematically shows an example HMD device 100 configured to control a display system based at least upon detecting a change in an environmental visibility condition. The display system of the HMD device 100 includes a left display 102 configured to be transparent or partially transparent such that a user wearing the HMD device 100 can see the surrounding environment through the left display 102. The left display 102 can take the form, for example, of an optical waveguide that delivers images projected by a left projector 104. Similarly, the display system also comprises a right display 106 configured to be transparent or partially transparent and to deliver images projected by a right projector 108. Upon detecting the change in the environmental visibility condition, the HMD device 100 is configured to switch the display system to operate in a pass-through mode in which pass-through VR images are utilized, as discussed in more detail below. As such, the HMD device 100 comprises a left image sensor 110 and a right image sensor 112. Here, the display system can utilize image data from the left and right image sensors 110, 112 for detecting changes in environmental visibility conditions, and for acquiring images for display as pass-through VR images. Examples of image sensors include infrared (IR) cameras, depth cameras (e.g., time-of-flight cameras or structured light cameras), visible light cameras (including stereo camera arrangements), low-light cameras, and single pixel photodetectors. Examples of a display system operating in see-through and pass-through modes are discussed with reference to FIGS. 3A and 3B, respectively.

The HMD device 100 also comprises a dimmer 114. In the example of FIG. 1, the dimmer 114 is located between the surrounding physical environment and the left and right displays 102, 106. In this manner, the dimmer 114 is located behind the left display 102 and the right display 106, and in front of the external environment, from a user's perspective when wearing the HMD device 100. The dimmer 114 is controllable to change an opacity of a view through the left display 102 and the right display 106. The term "transparent mode" is used herein to refer to a dimmer being transparent or partially transparent such that the user can see through the dimmer with natural vision when wearing the HMD device 100. The term "opaque mode" is used herein to refer to the dimmer being controlled to be more opaque than in the transparent mode to provide contrast for displaying pass-through VR images. FIG. 1 is illustrative. In other examples, an HMD device can have another configuration.

Figure 2:
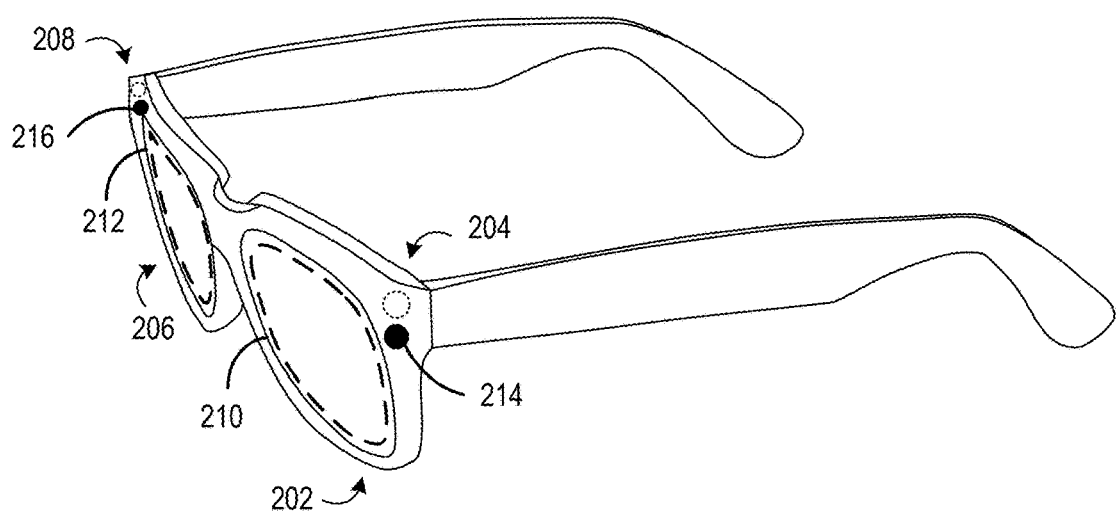
FIG. 2 schematically illustrates another example HMD device.

FIG. 2 schematically depicts another example HMD device 200 in the form of glasses. Similar to the HMD device 100, the HMD device 200 comprises a display system including a left display 202, a left projector 204, a right display 206, and a right projector 208. In contrast with the HMD device 100 of FIG. 1, the HMD device 200 comprises a left dimmer 210 and a right dimmer 212 instead of a single dimmer. The left and right dimmers 210, 212 each can have similar configurations to the dimmer 114.

The HMD device 200 also comprises a left image sensor 214 and a right image sensor 216. Similar to the HMD device 100, the HMD device 200 is configured to detect a change in an environmental visibility condition based at least upon data from the left image sensor 214 and/or the right image sensor 216. Further, upon detecting the change in the environmental visibility condition, the HMD device 200 can switch the display system from a see-through mode to a pass-through mode. When operating in the pass-through mode, the HMD device 200 can control the display system to display VR images based at least upon image data from left image sensor 214 and/or right image sensor 216. Likewise, the HMD device 200 can switch the display system from the pass-through mode to operate in the see-through mode. FIG. 2 is illustrative. In other examples, an HMD device can have another configuration.

Figure 3B:
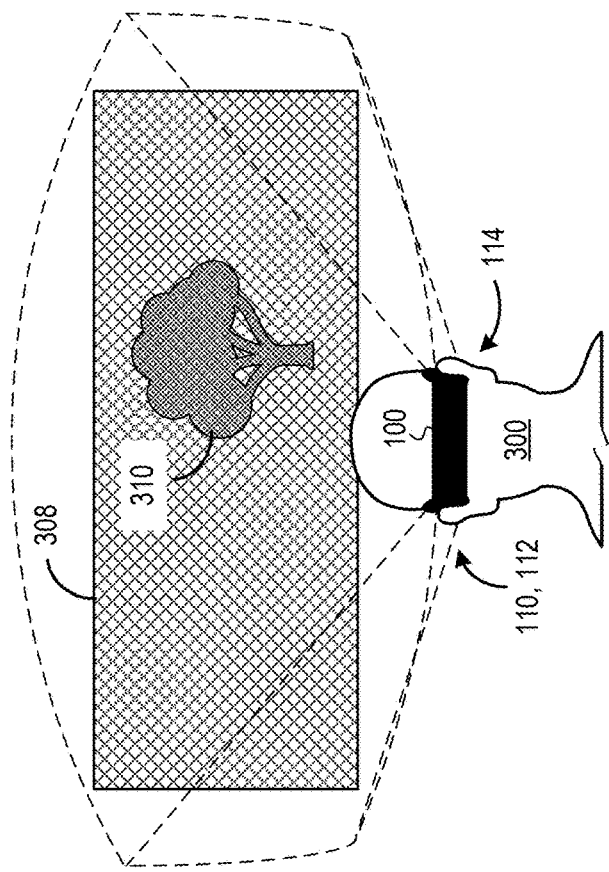
FIGS. 3A and 3B schematically depict the HMD device of FIG. 1 detecting a change in an environmental visibility condition, and changing from a see-through mode to a pass-through mode in response.
Figure 3A:
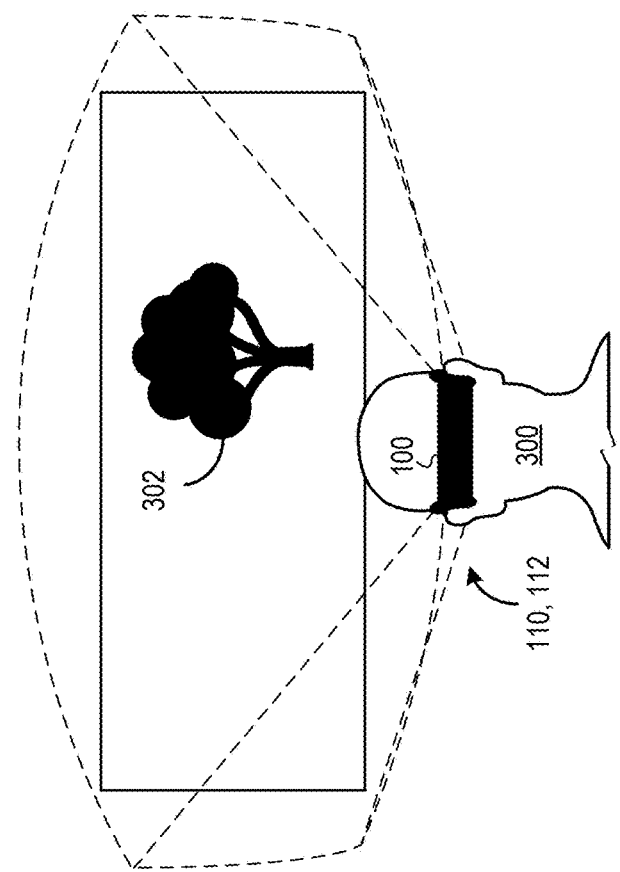

As mentioned above, a change in an environmental visibility condition can result in a change in a user's ability to see a surrounding environment through a see-through display system of an HMD device. FIGS. 3A and 3B schematically illustrate transitioning between a see-through mode and a pass-through mode on the HMD device 100 when moving from a bright environment to a low-light environment. In FIG. 3A, a user 300 is utilizing the HMD device 100 in a see-through mode 304, with the dimmer in a transparent mode. The user 300 can perceive an object 302 in the surrounding environment through the see-through display system of the HMD device 100 due to the bright environment.

Referring next to FIG. 3B, the HMD device 100 detects a change in an environmental visibility condition from the bright light to the low-light condition. In the low-light condition, the light brightness drops to a level that can impede the ability of the user 300 to perceive the object 302 through the see-through display system. In response to detecting the change, the HMD device 100 switches the see-through display system from the see-through mode 304 to a pass-through mode 306. Additionally, the HMD device 100 also switches the dimmer 114 to operate in an opaque mode. Here, the display system is displaying pass-through VR images 308 of the surrounding environment. As a specific example, the left image sensor 110 and/or the right image sensor 112 obtain image data of the object 302, and the display system displays an image 310 of the object based at least upon the image data of the object 302. In various examples, the image 310 of the object can be in the form of, for example, a mesh representation of a depth image, a night vision image, a brightness-enhanced RGB image, or other suitable form.

Continuing, the user's eyes may adapt to the low-light condition over time such that the user 300 may be able to perceive the object 302 with natural vision. In some such examples, the HMD device 100 can be configured to gradually transition the display system to operate in the see-through mode 304 and the dimmer to operate in the transparent mode. As a specific example, the HMD device 100 can be configured to lower the brightness of the projectors of the display system and increase visible light transmission through the dimmer over time. In this manner, the HMD device 100 can transition back to enabling natural vision for perceiving the surrounding environment. In other examples, a more rapid transition between the see-through mode 304 and the pass-through mode 306 (or vice versa) can be used.

Figure 4:
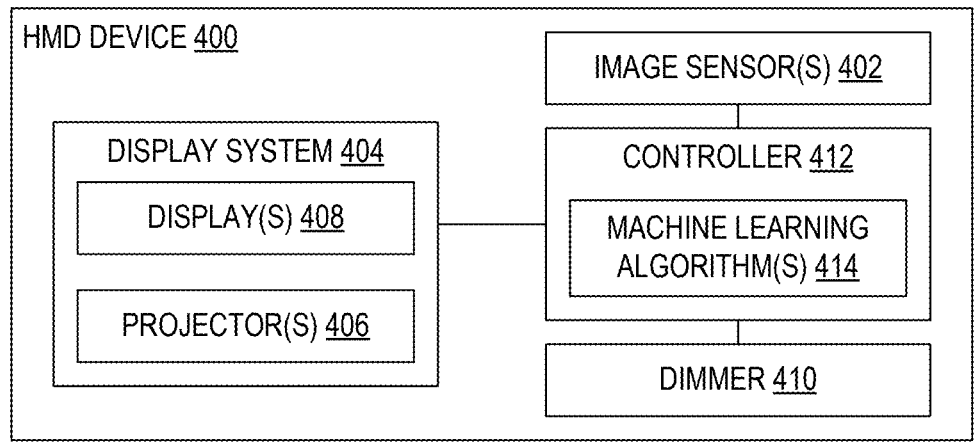
FIG. 4 depicts a block diagram of an example HMD device.

FIG. 4 illustrates a block diagram of an example HMD device 400. The HMD device 100 and the HMD device 200 are examples of the HMD device 400. Here, the HMD device 400 comprises one or more image sensors 402 for obtaining image data of the surrounding environment. In various examples, each image sensor 402 can include a single pixel or a plurality of pixels. Examples of image sensors include infrared (IR) cameras, depth cameras (e.g., time-of-flight cameras or structured light cameras), visible light cameras (including stereo camera arrangements), thermal cameras, low-light cameras, photodetectors, and other suitable image sensors.

The HMD device 400 comprises a display system 404 including one or more projectors 406 for displaying MR images and pass-through VR images. In some examples, the display system 404 can include a left projector and a right projector for projecting stereoscopic images. In other examples, a single projector may project left eye and right eye content. Each projector 406 includes an image generating device. Example image generating devices include scanning laser display systems, or image producing panels such as micro-LED (light-emitting diode) arrays, liquid crystal on silicon (LCoS) microdisplays, or organic light-emitting diode (OLED) microdisplays. The display system 404 also includes one or more displays 408 to display images projected by the one or more projectors 406. The one or more displays 408 are configured to be at least partially transparent to enable a user to view physical, real-world objects in a physical space through the one or more displays 408. In some examples, the display system 404 can include left-eye and right-eye near-eye displays, such as an optical waveguide that delivers images projected by corresponding left-eye and right-eye projectors.

The HMD device 400 also includes a dimmer 410 with a controllable opacity. In some examples, the dimmer 410 can be configured such that different dimmer segments of the dimmer 410 are independently controllable. The dimmer 410 can include an electrochemical panel or a liquid crystal panel.

A controller 412 is configured to selectively switch the display system 404 between operating in a pass-through mode and operating in a see-through mode based at least in part upon detecting a change in an environmental visibility condition. Alternatively or additionally, the controller 412 can be configured to control the display system 404 to independently switch one or more segments of a plurality of segments of a FOV of the display system 404 between operating in the pass-through mode and operating in the see-through mode, as discussed in more detail with reference to FIGS. 5A and 5B. The plurality of segments can be arranged within the FOV of the display system 404 in any suitable manner.

The controller 412 is also configured to operate the dimmer 410 based at least upon the operating mode of the display system 404. For example, the dimmer 410 operates in a transparent mode when the display system 404 is operating in the see-through mode so that the user can see the surrounding environment through the display system 404 and the dimmer 410. Further, the dimmer 410 operates in an opaque mode when the display system 404 is operating in the pass-through mode. Such a configuration helps to provide visual contrast to the user for the display of pass-through VR images. Additionally, such a configuration also helps to prevent confusion from double images that can arise from the surrounding environment being visible with natural vision while the VR images are projected. Nevertheless, in some examples, the display system 404 can be configured to display the VR images while also operating in the see-through mode so that the user can both see the VR images and see the surrounding environment through the HMD device 400. As a specific example, while the display system 404 is operating in the see-through mode, in which the surrounding environment is visible through the HMD device 400, the display system 404 can also project images (for example, images based upon image data acquired by a low-light camera). In such a configuration, the user may perceive both the physical environment with natural vision and projected images that show detail of the surrounding environment that is not easily perceptible by natural vision.

The controller 412 is also configured to detect the change in the environmental visibility condition, such as by using image data from the one or more of the image sensor(s) 402. In some examples, the controller 412 can be configured to individually detect the change in the environmental visibility condition for one or more segments of a plurality of segments of the FOV of the display system 404. In some such examples, the controller 412 can be configured to measure light intensity in each segment of the one or more segments using signal intensity of one or more corresponding pixels of the image sensor(s) 402. In this manner, the controller 412 can individually detect the change for each of the one or more segments. In other examples, the change in the environmental visibility condition can be individually detected for each segment in another suitable manner.

In some examples, the controller 412 can be configured to use one or more machine learning algorithms 414 to analyze the image data to detect the change in the environmental visibility condition. For example, the machine learning algorithms 414 can include one or more machine learning models, such as neural network models (e.g., feed-forward neural network models), to detect changes in the environmental visibility condition. The machine learning models can be trained with labeled data using back propagation and any suitable cost function (e.g., mean squared error, mean absolute error, root mean squared error, etc.). The labeled data can comprise, for example, image data, along with information regarding identification of imaged environmental visibility conditions. After training, such a machine learning model can be used to detect a change in an environmental visibility condition based at least on current image data from the image sensors 402. As a specific example, a machine learning model can be trained to detect diffuse visibility conditions, for example, such as arising from smoke. In some examples, the machine learning algorithms 414 can analyze image data to individually detect the change in the environmental visibility condition for different segments of the plurality of segments of the FOV. In other examples, the environmental visibility condition can be detected using other logic than a machine learning model. For example, an environmental visibility condition can be detected by an environmental light intensity that is below a threshold intensity and/or a differential in the environmental light intensity between segments of the FOV of the display system.

In some examples, when the controller 412 switches the display system 404 in response to detecting the change, the controller 412 may vary the response over time to allow the human eye to naturally adapt to the change. For example, the controller 412 can be configured to perform a smooth transition at a transition speed based upon a pupil response time of humans. The transition can be linear or another suitable function. In other examples, the controller 412 may perform a transition based at least upon an amount of the detected change in the environmental visibility condition (e.g., a higher relative change in light intensity versus a lower relative change in the light intensity). In further examples, the controller 412 may vary the response over time in any other suitable manner.

Environmental visibility conditions may not change uniformly throughout the FOV of an HMD device. For example, in the instance of a firefighter wearing an HMD device while entering a burning structure, smoke in the surrounding environment may not be uniform. Thus, diffuse lighting conditions arising from the smoke may exist for select segments of the FOV and not for other segments. Such diffuse lighting conditions may occlude objects from natural vision for the select segments, while the other segments of the FOV may still be able to utilize natural vision. Therefore, an HMD device can be configured to control a display system to independently switch one or more segments of a plurality of segments of a FOV of a display system between operating in the see-through mode and operating in the pass-through mode, as previously discussed.

Figure 5A:
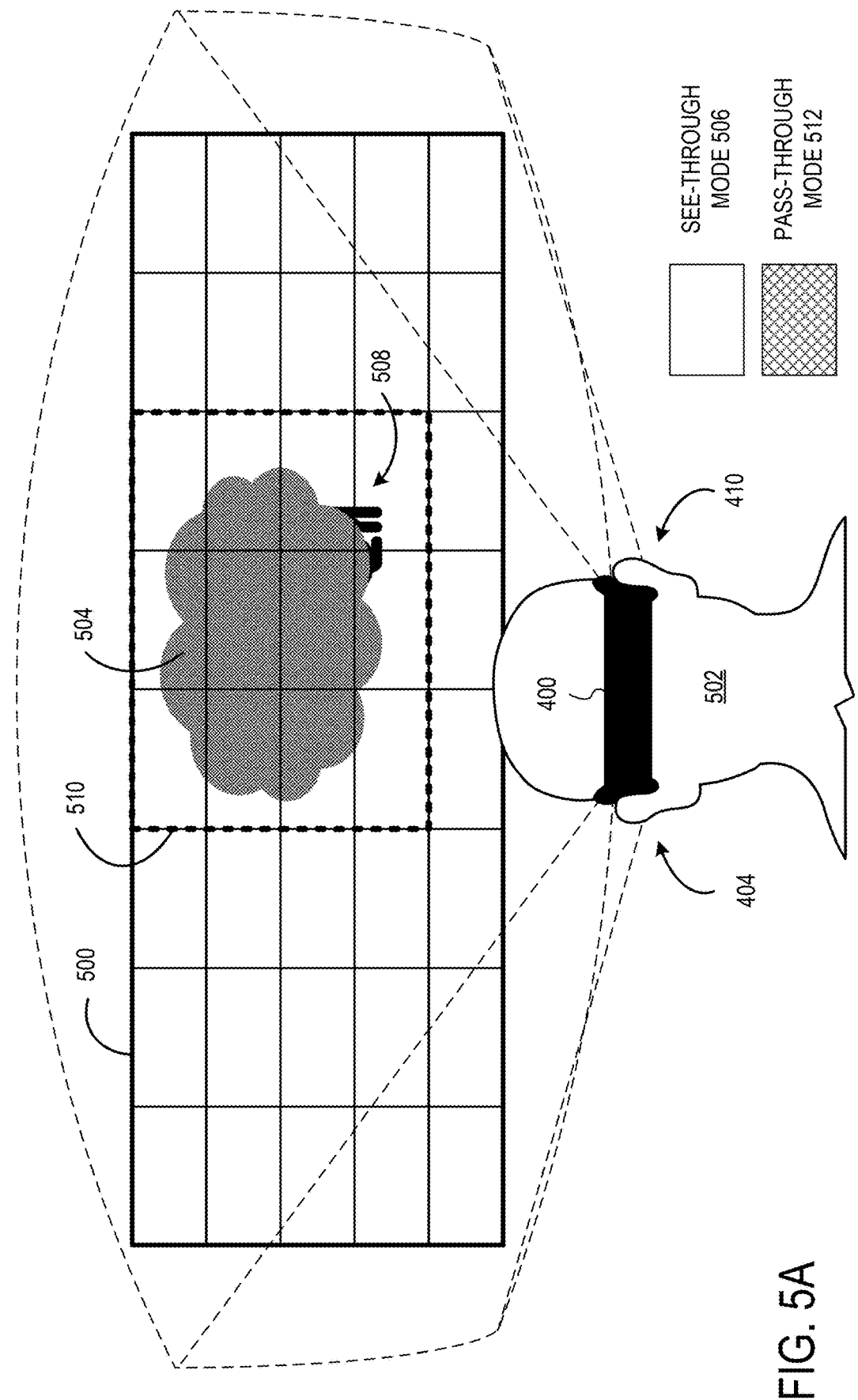
FIGS. 5A and 5B schematically depict an example HMD device switching a portion of a field of view of a display system from a see-through mode to a pass-through mode.
Figure 5B:
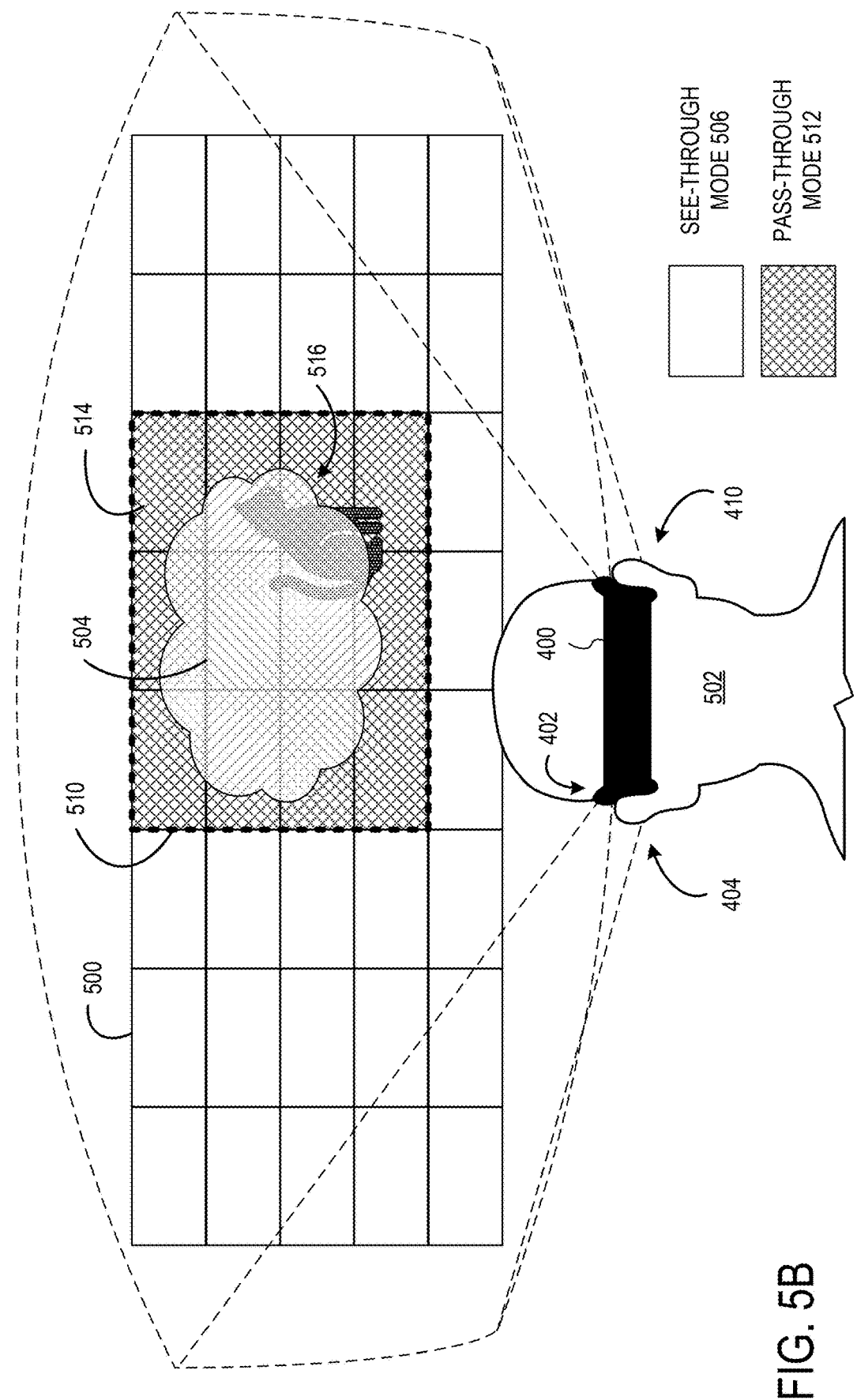

FIGS. 5A and 5B schematically illustrate the HMD device 400 from FIG. 4 utilizing an example plurality of segments 500 of the FOV of the display system 404. Here, a user 502 is utilizing the HMD device 400 to perceive an environment that has particulate matter, for example, in the form of smoke 504. In FIG. 5A, the display system 404 is operating in a see-through mode 506. Additionally, the dimmer 410 is operating in a transparent mode. Therefore, the user 502 is utilizing natural vision to perceive the environment. However, the smoke 504 has sufficient particulate matter to result in a diffuse visibility condition that occludes an object 508 from the natural vision of the user 502. As previously mentioned, the HMD device 400 can individually detect a change in an environmental visibility condition for each segment of the plurality of segments 500. In the current example, the HMD device 400 detects the change by detecting that the diffuse visibility condition arising from the smoke 504 exists for segments 510 of the plurality of segments 500. In such examples, a corresponding dimmer segment for a display FOV segment may be dimmed fully or partially, or left in a transparent mode, when the HMD device switches the segment from a see-through mode to a pass-through mode.

In response to detecting that the diffuse visibility condition exists for the segments 510, the HMD device 400 controls the display system 404 to switch the segments 510 from the see-through mode 506 to the pass-through mode 512, as depicted in FIG. 5B. Here, the display system 404 displays content based at least upon image data from the image sensor(s) 402 (e.g., a thermal image) for the segments 510. Such a pass-through VR image 514 enables the user 502 to see an imaged object 516 (depicted here as a cat) that is at least somewhat occluded from natural vision by smoke 504. In this example, the imaged object 516 can be based at least upon thermal image data of the object 508. In other examples, the imaged object 516 can be based at least upon any suitable image data from the image sensor(s) 402. In such a manner, the user 502 can perceive additional information regarding the environment than with simply using natural vision.

Additionally, the HMD device 400 also controls a plurality of dimmer segments of the dimmer 410 that correspond to the segments 510. This allows the dimmer segments to be independently operated in an opaque mode or transparent mode. Operating segments 510 in the opaque mode in the example of FIG. 5B helps to provide greater contrast for projected images (e.g., imaged object 516) and may also help to address issues of misalignment between pass-through images and a see-through view compared to a dimmer that does not switch operation of the dimmer segments. Other segments of the plurality of segments 500 continue to operate in the see-through mode 506, and corresponding dimmer segments continue to operate in the transparent mode. In such a manner, the HMD device 400 can control local dimming of the dimmer 410 while determining whether to render images from the image sensor(s) 402 for a given segment of the plurality of segments 500. While the number of dimmer segments is depicted here with a one-to-one ratio to the plurality of segments 500, it will be understood that any suitable ratio of dimmer segments to a plurality of segments of an FOV may be used in other examples. FIGS. 5A and 5B are illustrative. In other examples, a plurality of segments of a FOV of a display system and/or dimmer segments of a dimmer may have another configuration.

Figure 6:
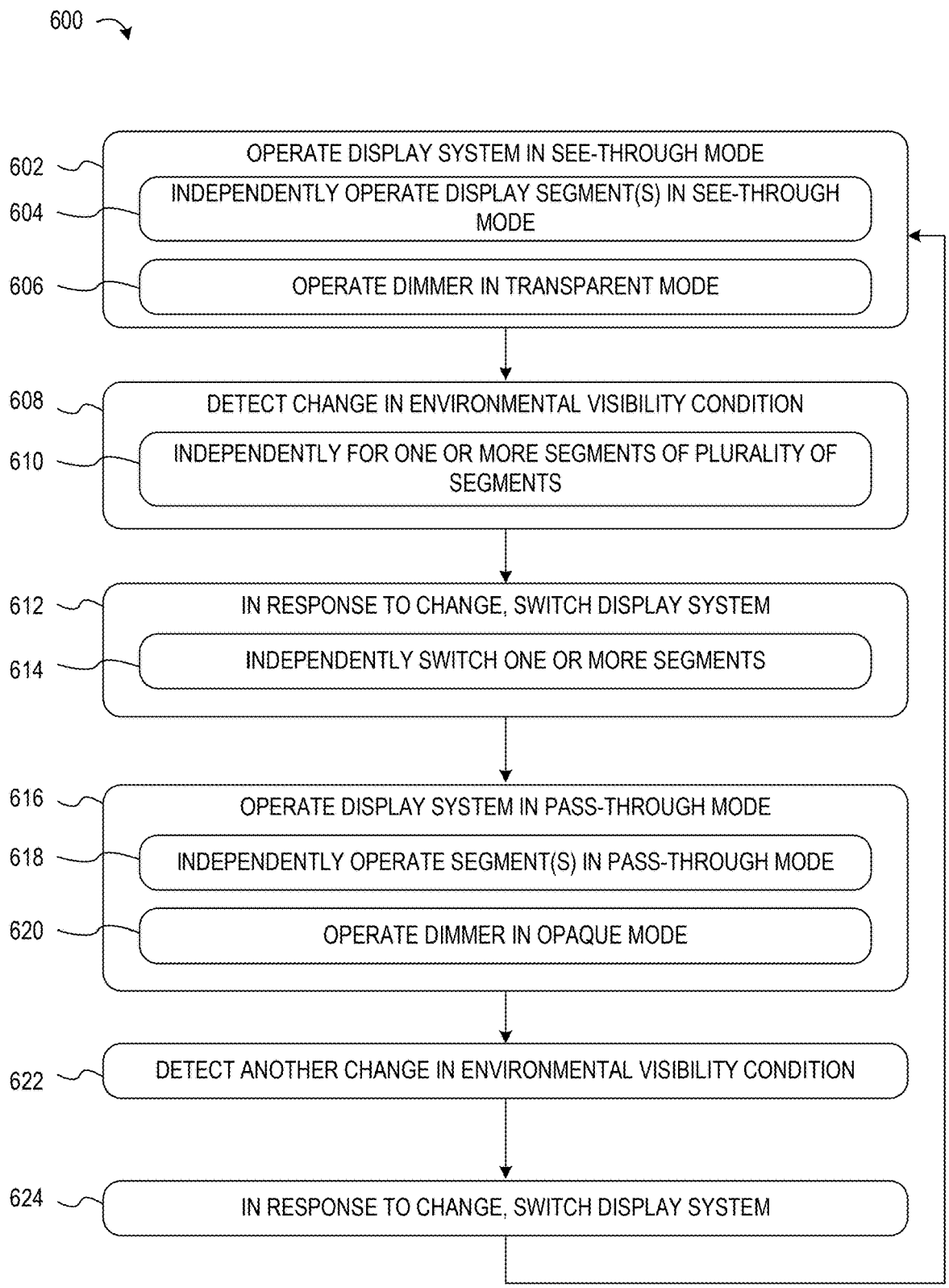
FIG. 6 illustrates a flow diagram of an example method of switching a display system between see-through and pass-through modes based at least upon an environmental visibility condition.

FIG. 6 illustrates a flow diagram illustrating an example method 600 for utilizing an environmental visibility condition to switch a display system between operating modes. The method 600 can be performed on an HMD device comprising a display system, such as HMD device 100, HMD device 200, or HMD device 400.

The method 600 comprises, at 602, operating the display system in a see-through mode. For example, the display system can display MR images that appear integrated with the physical world when in the see-through mode. Additionally or alternatively, operating the display system in the see-through mode comprises operating one or more segments of a plurality of segments of a FOV of the display system in the see-through mode, as indicated at 604. In some examples, the HMD device also comprises a dimmer. In such examples, the method 600 comprises, at 606, operating the dimmer in a transparent mode when operating the display system in the see-through mode so that the user can perceive the surrounding environment with natural vision through the HMD device.

The method 600 comprises, at 608, detecting a change in an environmental visibility condition. In some examples, detecting the change in the environmental visibility condition comprises detecting the change in the environmental visibility condition individually for the one or more segments of the plurality of segments of the FOV, as indicated at 610.

The method 600 also comprises, in response to the change, switching the display system from the see-through mode to the pass-through mode, as indicated at 612. In some examples, switching the display system to the pass-through mode comprises independently switching the one or more segments from the see-through mode to the pass-through mode, as indicated at 614. Then, the method 600 then operates the display system in the pass-through mode, as indicated at 616, which can include independently operating one or more segments in the pass-through mode, at 618. In examples where the HMD device includes a dimmer, the method 600 further includes, at 620, operating the dimmer in an opaque mode when operating the display system in the pass-through mode.

In some examples, the method 600 also comprises detecting another change in the environmental visibility condition, as indicated at 622. Here, detecting the other change includes detecting a change in which suitable conditions for natural vision exists. Additionally or alternatively, detecting the other change includes individually detecting the other change for one or more segments of the plurality of segments. The method 600 further can comprise, at 624, in response to the change, switching the display system from the pass-through mode to the see-through mode. In some examples, switching the display system can comprise switching one or more display segments and/or dimmer segments. Here, the method 600 returns to operating, at 602, the display system in the see-through mode.

Various methods can be used to detect a change in an environmental visibility condition. For example, a change in an environmental visibility condition can be detected using image data from an image sensor of an HMD device. In some such examples, detecting the change comprises using machine learning algorithms to analyze the image data, such as to detect a diffuse visibility condition (e.g., due to particulate matter such as smoke, due to fog, etc.). In other examples, other suitable algorithms may be used to analyze the image data, e.g., such as by detecting a threshold low-light condition. In various examples, the threshold low-light condition can be detected for a FOV as a whole, or for individual segments of a plurality of segments of the FOV. Detecting the change in the environmental visibility condition individually for the one or more segments can comprises, for each segment of the one or more segments, measuring light intensity in the segment using signal intensity of one or more corresponding pixels of the image sensor.

An HMD device according to the disclosed examples can help enable a user to transition between environments with different levels of natural visibility while maintaining a view of a surrounding environment as the HMD device automatically switches between see-through and pass-through modes. This may be more efficient and user-friendly than requiring a user to switch between display modes manually.

In some examples, the methods and processes described herein may be tied to a computing system of one or more computing devices. In particular, such methods and processes may be implemented as a computer-application program or service, an application-programming interface (API), a library, and/or other computer-program product.

Figure 7:
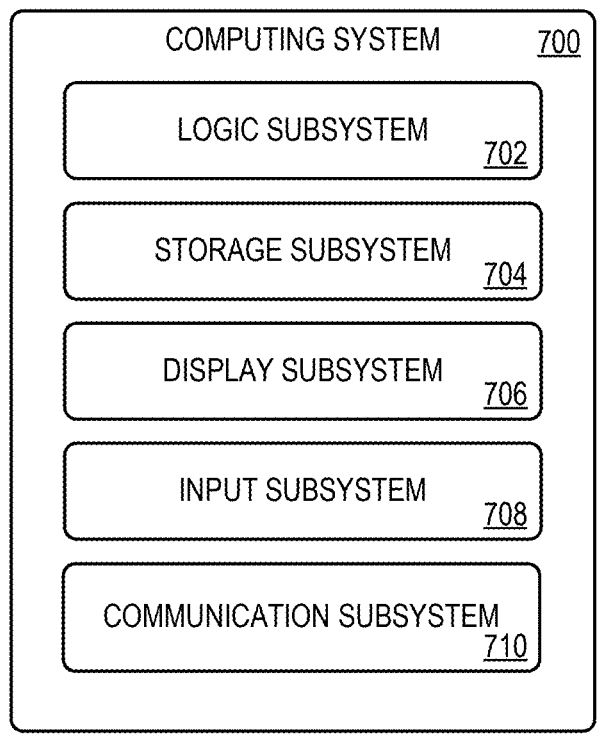
FIG. 7 shows a block diagram of an example computing system.

FIG. 7 schematically shows an example of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. The HMD device 100, the HMD device 200, and the HMD device 400 are examples of the computing system 700.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 704 includes one or more physical devices configured to hold instructions executable by the logic machine to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 702 executing instructions held by storage subsystem 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 706 may be used to present a visual representation of data held by storage subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on-or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local-or wide-area network. In some examples, the communication subsystem may allow computing system 700 to send and/or receive messages to and/or from other devices via a network such as the Internet.

One example provides a method enacted on a head mounted display (HMD) device including a display system. The method comprises operating the display system in one of a pass-through mode or a see-through mode, detecting a change in an environmental visibility condition using image data from an image sensor of the HMD device, and in response to the change, switching the display system to operate in another of the pass-through mode or the see-through mode. In some such examples, operating the display system in the one of the pass-through mode or the see-through mode alternatively or additionally comprises operating a dimmer in an opaque mode when operating the display system in the pass-through mode, and operating the dimmer in a transparent mode when operating the display system in the see-through mode. In some such examples, detecting the change in the environmental visibility condition alternatively or additionally comprises detecting a threshold low-light condition. In some such examples, detecting the change in the environmental visibility condition using the image data alternatively or additionally comprises using machine learning algorithms to analyze the image data. In some such examples, detecting the change in the environmental visibility condition alternatively or additionally comprises detecting that a diffuse visibility condition arising from particulate matter exists, and in response, switching the display system to operate in the other of the pass-through mode or the see-through mode. In some such examples, detecting the change in the environmental visibility condition alternatively or additionally comprises detecting the change in the environmental visibility condition individually for one or more segments of a plurality of segments of a FOV of the display system, and switching the display system to operate in the other of the pass-through mode or the see-through mode alternatively or additionally comprises independently switching the one or more segments to operate in the other of the pass-through mode or the see-through mode. In some such examples, detecting the change in the environmental visibility condition individually for the one or more segments of the plurality of segments of the FOV alternatively or additionally comprises, for each segment of the one or more segments, measuring light intensity in the segment using signal intensity of one or more corresponding pixels of the image sensor on the HMD device.

Another example provides a head mounted display (HMD) device comprising a display system, and a controller configured to selectively switch the display system from one of a pass-through mode or a see-through mode to operate in another of the pass-through mode or the see-through mode based at least in part upon detecting a change in an environmental visibility condition. In some such examples, the HMD device alternatively or additionally comprises a dimmer, and the controller is alternatively or additionally configured to operate the dimmer in an opaque mode when operating the display system in the pass-through mode, and a transparent mode when operating the display system in the see-through mode. In some such examples, the HMD device alternatively or additionally comprises an image sensor, and the controller alternatively or additionally is configured to detect the change in the environmental visibility condition within a field of view (FOV) of the display system by using image data from the image sensor. In some such examples, the controller alternatively or additionally is configured to detect the change in the environmental visibility condition using the image data by using machine learning algorithms to analyze the image data. In some such examples, the controller alternatively or additionally is configured to detect the change in the environmental visibility condition by detecting that a diffuse visibility condition arising from particulate matter exists, and in response, switching the display system to operate in the other of the pass-through mode or the see-through mode. In some such examples, the controller alternatively or additionally is configured to detect the change in the environmental visibility condition individually for one or more segments of a plurality of segments of a FOV of the display system, and control the display system to independently switch the one or more segments to operate in the other of the pass-through mode or the see-through mode. In some such examples, the controller alternatively or additionally is configured to detect the change in the environmental visibility condition individually for the one or more segments by, for each segment of the one or more segments, measuring light intensity in the segment using signal intensity of one or more corresponding pixels of the image sensor.

Another example provides a head mounted display (HMD) device comprising a display system including a field of view (FOV), and a controller configured to control the display system to independently switch one or more segments of a plurality of segments of the FOV from one of a pass-through mode or a see-through mode to operate in another of the pass-through mode or see-through mode based at least in part upon detecting a change in an environmental visibility condition. In some such examples, the HMD device alternatively or additionally comprises a dimmer, and the controller is alternatively or additionally configured to control the dimmer to independently operate one or more dimmer segments in an opaque mode when controlling the display system to independently operate the one or more segments in the pass-through mode, and a transparent mode when controlling the display system to independently operate the one or more segments in the see-through mode. In some such examples, the HMD device alternatively or additionally comprises an image sensor, and the controller alternatively or additionally is configured to detect the change in the environmental visibility condition by using image data from the image sensor. In some such examples, the controller alternatively or additionally is configured to detect the change in the environmental visibility condition for the one or more segments by using machine learning algorithms to analyze the image data. In some such examples, the controller alternatively or additionally is configured to detect the change in the environmental visibility condition individually for the one or more segments by, for each segment of the one or more segments, measuring light intensity in the segment using signal intensity of one or more corresponding pixels of the image sensor. In some such examples, the controller alternatively or additionally is configured to detect the change in the environmental visibility condition by detecting that a diffuse visibility condition arising from particulate matter exists and in response, switching the one or more segments to operate in the other of the pass-through mode or the see-through mode.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a head mounted display (HMD) device including a display system, a method comprising:
   operating the display system in one of a pass-through mode for displaying pass-through virtual reality (VR) images or a see-through mode for displaying mixed reality (MR) images;
   detecting a change in an environmental visibility condition using image data from an image sensor of the HMD device; and
   in response to the change, switching the display system to operate in another of the pass-through mode or the see-through mode.

2. The method of claim 1, wherein operating the display system in the one of the pass-through mode or the see-through mode comprises operating a dimmer in an opaque mode when operating the display system in the pass-through mode, and operating the dimmer in a transparent mode when operating the display system in the see-through mode.

3. The method of claim 1, wherein detecting the change in the environmental visibility condition comprises detecting a threshold low-light condition.

4. The method of claim 1, wherein detecting the change in the environmental visibility condition using the image data comprises using machine learning algorithms to analyze the image data.

5. The method of claim 1, wherein detecting the change in the environmental visibility condition comprises detecting that a diffuse visibility condition arising from particulate matter exists, and in response, switching the display system to operate in the other of the pass-through mode or the see-through mode.

6. The method of claim 1, wherein detecting the change in the environmental visibility condition comprises detecting the change in the environmental visibility condition individually for one or more segments of a plurality of segments of a FOV of the display system, and
   wherein switching the display system to operate in the other of the pass-through mode or the see-through mode comprises independently switching the one or more segments to operate in the other of the pass-through mode or the see-through mode.

7. The method of claim 6, wherein detecting the change in the environmental visibility condition individually for the one or more segments of the plurality of segments of the FOV comprises, for each segment of the one or more segments, measuring light intensity in the segment using signal intensity of one or more corresponding pixels of the image sensor on the HMD device.

8. A head mounted display (HMD) device comprising:
   a display system; and
   a controller configured to selectively switch the display system from one of a pass-through mode for displaying pass-through virtual reality (VR) images or a see-through mode for displaying mixed reality (MR) images to operate in another of the pass-through mode or the see-through mode based at least in part upon detecting a change in an environmental visibility condition.

9. The HMD device of claim 8, further comprising a dimmer, and wherein the controller is further configured to operate the dimmer in
   an opaque mode when operating the display system in the pass-through mode, and
   a transparent mode when operating the display system in the see-through mode.

10. The HMD device of claim 8, further comprising an image sensor, and wherein the controller is configured to detect the change in the environmental visibility condition within a field of view (FOV) of the display system by using image data from the image sensor.

11. The HMD device of claim 10, wherein the controller is configured to detect the change in the environmental visibility condition using the image data by using machine learning algorithms to analyze the image data.

12. The HMD device of claim 10, wherein the controller is configured to detect the change in the environmental visibility condition by detecting that a diffuse visibility condition arising from particulate matter exists, and in response, switching the display system to operate in the other of the pass-through mode or the see-through mode.

13. The HMD device of claim 10, wherein the controller is configured to detect the change in the environmental visibility condition individually for one or more segments of a plurality of segments of a FOV of the display system, and control the display system to independently switch the one or more segments to operate in the other of the pass-through mode or the see-through mode.

14. The HMD device of claim 13, wherein the controller is configured to detect the change in the environmental visibility condition individually for the one or more segments by, for each segment of the one or more segments, measuring light intensity in the segment using signal intensity of one or more corresponding pixels of the image sensor.

15. A head mounted display (HMD) device comprising:
    a display system including a field of view (FOV); and
    a controller configured to control the display system to independently switch one or more segments of a plurality of segments of the FOV from one of a pass-through mode for displaying pass-through virtual reality (VR) images or a see-through mode for displaying mixed reality (MR) images to operate in another of the pass-through mode or see-through mode based at least in part upon detecting a change in an environmental visibility condition.

16. The HMD device of claim 15, further comprising a dimmer, and wherein the controller is further configured to control the dimmer to independently operate one or more dimmer segments in
    an opaque mode when controlling the display system to independently operate the one or more segments in the pass-through mode, and
    a transparent mode when controlling the display system to independently operate the one or more segments in the see-through mode.

17. The HMD device of claim 15, further comprising an image sensor, and wherein the controller is configured to detect the change in the environmental visibility condition by using image data from the image sensor.

18. The HMD device of claim 17, wherein the controller is configured to detect the change in the environmental visibility condition for the one or more segments by using machine learning algorithms to analyze the image data.

19. The HMD device of claim 17, wherein the controller is configured to detect the change in the environmental visibility condition individually for the one or more segments by, for each segment of the one or more segments, measuring light intensity in the segment using signal intensity of one or more corresponding pixels of the image sensor.

20. The HMD device of claim 15, wherein the controller is configured to detect the change in the environmental visibility condition by detecting that a diffuse visibility condition arising from particulate matter exists and in response, switching the one or more segments to operate in the other of the pass-through mode or the see-through mode.

* * * * *